(12) United States Patent
Arinaga et al.

(10) Patent No.: US 9,279,410 B2
(45) Date of Patent: Mar. 8, 2016

(54) WIND TURBINE GENERATOR, METHOD OF WIND TURBINE GENERATION, AND PROGRAM OF THE WIND TURBINE GENERATOR

(71) Applicant: MITSUBISHI HEAVY INDUSTRIES, LTD., Tokyo (JP)

(72) Inventors: Shinji Arinaga, Tokyo (JP); Akira Yasugi, Tokyo (JP); Takatoshi Matsushita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 8 days.

(21) Appl. No.: 14/241,887

(22) PCT Filed: Oct. 3, 2012

(86) PCT No.: PCT/JP2012/075592
§ 371 (c)(1),
(2) Date: May 6, 2014

(87) PCT Pub. No.: WO2013/058106
PCT Pub. Date: Apr. 25, 2013

(65) Prior Publication Data
US 2014/0284927 A1    Sep. 25, 2014

(30) Foreign Application Priority Data
Oct. 19, 2011   (JP) .................. 2011-229856

(51) Int. Cl.
F03D 9/00    (2006.01)
F03D 7/02    (2006.01)
F03D 7/04    (2006.01)

(52) U.S. Cl.
CPC .............. *F03D 7/0224* (2013.01); *F03D 7/042* (2013.01); *F05B 2260/96* (2013.01);

(Continued)

(58) Field of Classification Search
USPC .................. 290/44, 55; 700/287, 290, 37
See application file for complete search history.

(56) References Cited

U.S. PATENT DOCUMENTS 4,189,648 A * 2/1980 Harner ............................. 290/44
4,695,736 A * 9/1987 Doman et al. ................... 290/44

(Continued)

FOREIGN PATENT DOCUMENTS

| JP | 6-117353 A | 4/1994 |
| JP | 2005-45849 A | 2/2005 |
| JP | 2010-159647 A | 7/2010 |

OTHER PUBLICATIONS

International Search Report mailed Dec. 4, 2012 in International Application No. PCT/JP2012/075592, filed Oct. 3, 2012.

(Continued)

*Primary Examiner* — Julio Gonzalez Ramirez
(74) *Attorney, Agent, or Firm* — Kanesaka Berner and Partners LLP

(57) ABSTRACT

When a low voltage event occurs in a utility grid, a load on a spindle system is repressed so that a damage is prevented. A rotor having a plurality of wind turbine blades, a generator to be driven by rotation of the rotor, and a pitch angle controller for controlling a pitch angle of the wind turbine blade according to a generator speed are provided, and when a voltage of a utility grid is a predetermined value or less, the pitch angle controller controls the pitch angle so that torsional vibration generated on a spindle system for transmitting the rotation of the rotor to a generator system is repressed.

4 Claims, 4 Drawing Sheets

(52) U.S. Cl.
CPC .. *F05B 2270/1071* (2013.01); *F05B 2270/331* (2013.01); *F05B 2270/334* (2013.01); *F05B 2270/337* (2013.01); *Y02E 10/723* (2013.01)

(56) References Cited

U.S. PATENT DOCUMENTS

| | | | | |
|---|---|---|---|---|
| 4,700,081 | A | * | 10/1987 | Kos et al. ............ 290/44 |
| 4,703,189 | A | * | 10/1987 | DiValentin et al. ........ 290/44 |
| 6,921,985 | B2 | | 7/2005 | Janssen et al. |
| 8,026,623 | B2 | * | 9/2011 | Wakasa et al. ......... 290/44 |
| 2006/0214429 | A1 | | 9/2006 | Kikuchi et al. |
| 2007/0267873 | A1 | * | 11/2007 | Teichmann ............ 290/44 |
| 2009/0058086 | A1 | * | 3/2009 | Arinaga et al. ......... 290/44 |
| 2009/0066089 | A1 | * | 3/2009 | Arinaga et al. ......... 290/55 |
| 2010/0187820 | A1 | * | 7/2010 | Wakasa et al. ......... 290/44 |
| 2011/0031748 | A1 | * | 2/2011 | Arinaga et al. ......... 290/44 |
| 2014/0054892 | A1 | * | 2/2014 | Brown et al. .......... 290/44 |
| 2014/0217731 | A1 | * | 8/2014 | Arinaga et al. ......... 290/44 |

OTHER PUBLICATIONS

Written Opinion mailed Dec. 4, 2012 in International Application No. PCT/JP2012/075592, filed Oct. 3, 2012.

* cited by examiner

WIND TURBINE GENERATOR, METHOD OF WIND TURBINE GENERATION, AND PROGRAM OF THE WIND TURBINE GENERATOR

RELATED APPLICATIONS

The present application is a National Phase of International Application No. PCT/JP2012/075592, filed Oct. 3, 2012, and claims priority from Japanese Application No. JP 2011-229856 filed Oct. 19, 2011.

TECHNICAL FIELD

The present invention relates to a wind turbine generator, a method and a program of the wind turbine generator for repressing a load on a spindle system, for example, when a voltage of a utility grid drops.

BACKGROUND ART

Conventionally, it is known that when wind turbine blades of a wind turbine generator receive wind and a rotor having the wind turbine blades rotates, an eccentric load is applied to a spindle system that rotates via the rotor and thus torsional vibration occurs. Therefore, a method for repressing the torsional vibration is considered.

For example, Patent Document 1 proposes a technique for detecting a torsional vibration component of a shaft system between a generator and wind turbine blades based on a change in a rotational speed of the generator and adjusting an electric current according to the torsional vibration component so as to repress the torsional vibration.

CITATION LIST

Patent Literature

{PTL 1} Japanese Unexamined Patent Application, Publication No. 2005-45849

SUMMARY OF INVENTION

Technical Problem

The technique described in Patent Document 1 has an attenuation effect for repressing a further rise in a speed since when the generator operates and the speed rises, a torque increases. However, when the voltage of a utility grid is a predetermined value or less and an output power from a generator reduces, a load is eliminated and thus the attenuation effect of the generator is not exerted. For this reason, torsional vibration cannot be repressed, and thus a load on a mechanical sides of a gear box, gear, and bearing increases.

The present invention is devised from such a viewpoint, and its object is to provide a wind turbine generator, a method of wind turbine generation, and a program of the wind turbine generator for repressing a load on a spindle system and preventing a mechanical damage when a low voltage event occurs in the utility grid.

Solution to Problem

In order to solve the above problem, the present invention employs the following means.

A first aspect of the present invention provides a wind turbine generator including a rotor having a plurality of wind turbine blades, a generator to be driven by rotation of the rotor, and a pitch angle control means for outputting a pitch angle command value for controlling a pitch angle of the wind turbine blades according to the speed of the generator. When the voltage of a utility grid is a predetermined value or less, the pitch angle control means outputs the pitch angle command value so that torsional vibration generated on a spindle system for transmitting the rotation of the rotor to the generator is repressed.

In the wind turbine generator from the first aspect having the rotor having the plurality of wind turbine blades, the generator to be driven by rotation of the rotor, and the pitch angle control means for controlling the pitch angle command value of the wind turbine blades according to the speed of the generator, when the voltage of the utility grid is a predetermined value or less, the pitch angle of the wind turbine blades is controlled so that the torsional vibration generated on the spindle system for transmitting the rotation of the rotor to the generator is repressed.

When the voltage on the side of the utility grid drops, the pitch angle of wind turbine blades is controlled so that the torsional vibration is repressed. For this reason, the torsional vibration that is generated by stopping the generator can be securely repressed. As a result, at a time when the voltage drops, the load to be applied to the spindle system can be reduced, and mechanical damages of a gear box, a gear and a bearing can be prevented.

It is preferable that the wind turbine generator has a torsional vibration repressing means for, when the voltage of the utility grid is a predetermined value or less, outputting a pitch angle correcting amount for repressing torsional vibration using an aerodynamic torque calculated by differentiating a value of the speed of the generator, and the pitch angle control means determines the pitch angle command value based on the pitch angle correcting amount.

Since the pitch angle correcting amount is calculated based on the speed, even when torsional vibration is generated and the speed fluctuates, the torsional vibration can be securely reduced by an attenuation effect due to the aerodynamic torque corresponding to the fluctuated speed.

It is preferable that the pitch angle control means of the wind turbine generator determines the pitch angle command value based on the temporary pitch angle command value determined based on a first pitch angle control value determined by a difference between the speed of the generator and a rated speed and a second pitch angle control value determined by a difference between an output power of the generator and a rated power, and the pitch angle correcting amount.

A second aspect of the present invention provides a method for controlling a wind turbine generator including a rotor having a plurality of wind turbine blades, and a generator to be driven by rotation of the rotor, the wind turbine generator outputting a pitch angle command value for controlling a pitch angle of the wind turbine blades according to a speed of the generator, wherein the method comprises, when a voltage of a utility grid is a predetermined value or less, outputting the pitch angle command value so that torsional vibration generated on a spindle system for transmitting the rotation of the rotor to the generator is repressed.

A third aspect of the present invention provides a program for controlling a wind turbine generator including a rotor having a plurality of wind turbine blades, and a generator to be driven by rotation of the rotor, the wind turbine generator outputting a pitch angle command value for controlling a pitch angle of the wind turbine blades according to a speed of the generator, wherein the program allows, when a voltage of a utility grid is a predetermined value or less, a computer to execute a process for outputting the pitch angle command value so that torsional vibration generated on a spindle system for transmitting the rotation of the rotor to the generator is repressed.

Advantageous Effects of Invention

The present invention produces an effect such that a load on a spindle system is repressed and a damage can be prevented when the low voltage event occurs in the utility grid.

DESCRIPTION OF EMBODIMENTS

A wind turbine generator, a method and program of the wind turbine generator according to the present invention are described below with reference to the drawings.

Figure 1:
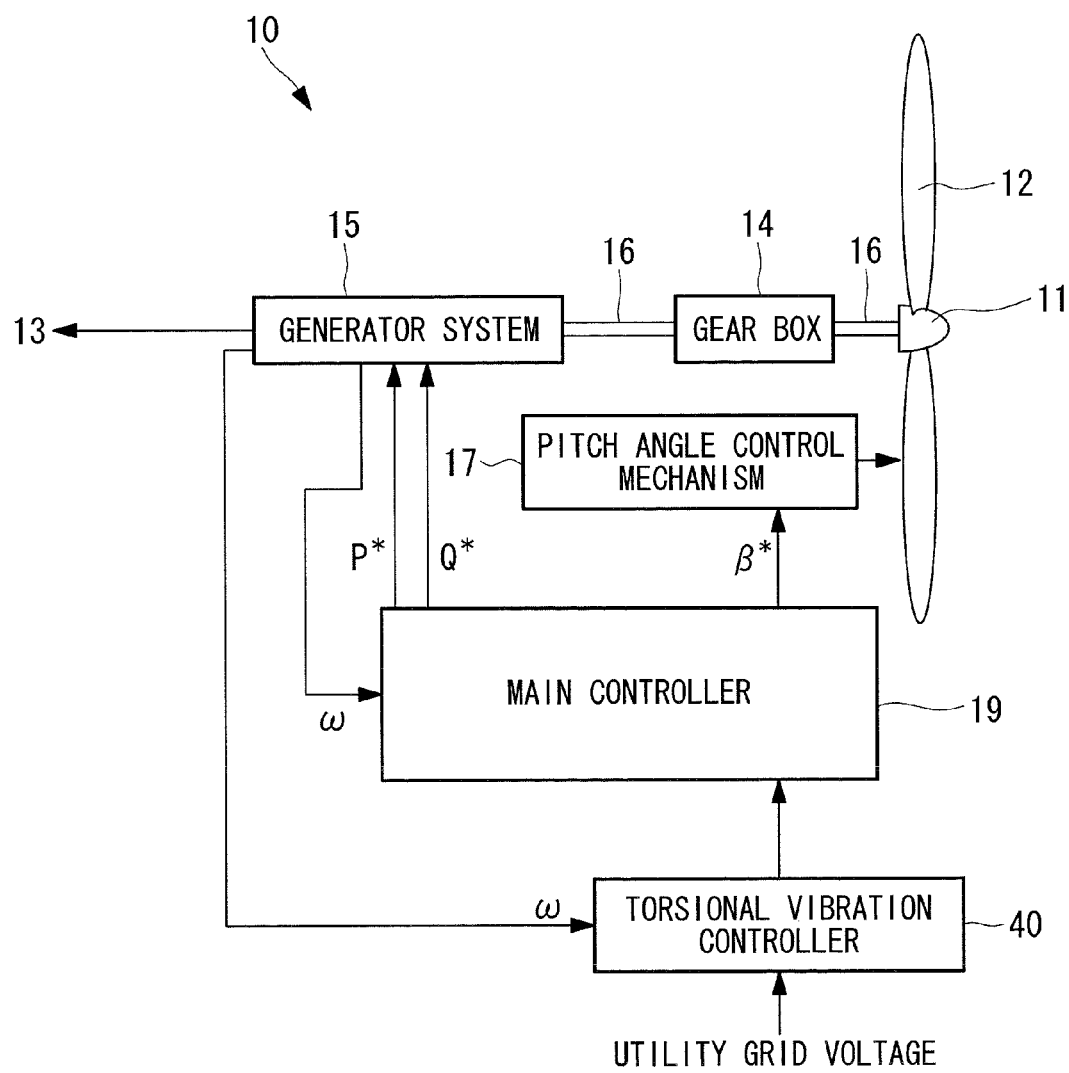
FIG. 1 is a diagram illustrating a schematic constitution of a wind turbine generator according to one embodiment of the present invention.

As shown in FIG. 1, a wind turbine generator 10 according to this embodiment includes a wind turbine rotor 11, wind turbine blades 12, a gear box 14, a generator system 15, a pitch angle control mechanism 17, a main controller 19, and a torsional vibration repressing section (torsional vibration repressing means) 40. The wind turbine generator 10 is connected to a utility grid 13. Further, the wind turbine rotor 11, the gear box 14, and the generator system 15 are connected by a spindle 16.

A plurality of wind turbine blades 12 mounted to the wind turbine rotor 11 receives wind energy to rotate together with the wind turbine rotor 11, and is sped up by the gear box 14. Thereafter, a generator in the generator system 15 is driven to generate a power and converts the wind energy into electric energy. The wind turbine generator according to this embodiment is a variable speed rotation control type wind turbine generator, and uses a wound-rotor induction generator or a synchronous generator as the generator. The constitution using the synchronous generator uses an AC-DC-AC link system that once converts an output power of the generator into a direct current and again converts it into an alternate current through an inverter.

The main control device 19 determines and outputs an active power command P*, a reactive power command Q*, and a pitch angle command β* based on a generator speed co measured in the generator system 15.

The pitch angle control mechanism 17 controls a pitch angle of the wind turbine blades 12 based on the pitch angle command β* and its constitution is similar to conventional one.

The torsional vibration repressing section 40 (details are described later) outputs a pitch angle correcting amount for calculating the pitch angle command value β* based on voltage information about the utility grid 13 and a value of the generator speed ω.

Figure 2:
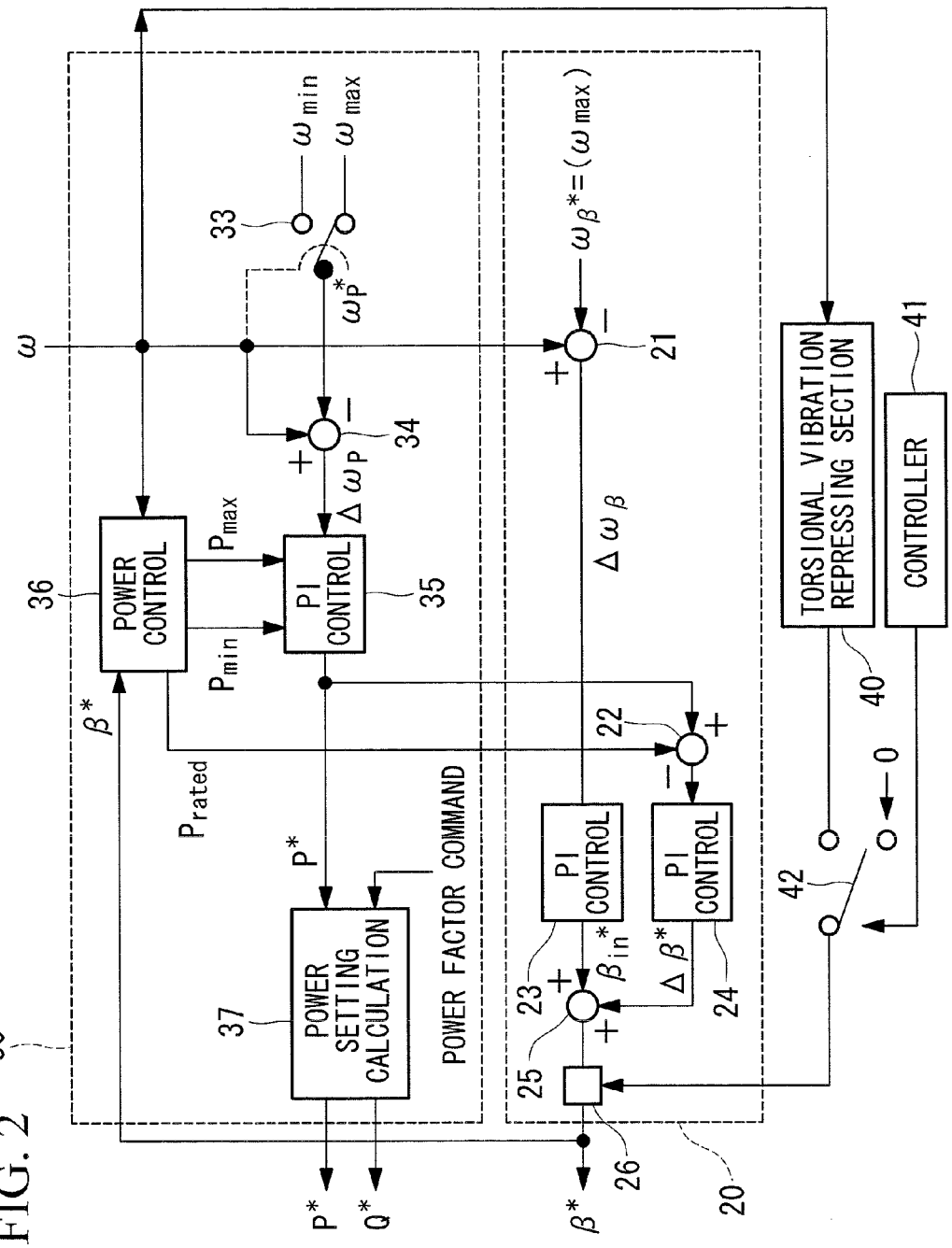
FIG. 2 is a functional block diagram illustrating development of a pitch angle controller, a power controller, and a torsional vibration repressing section.

FIG. 2 is a block diagram illustrating a schematic constitution of the torsional vibration repressing section 40, a pitch angle controller 20 and a power controller 30 included in the main controller 19.

Switching of connection of a switching section 42 is controlled by a controller 41.

When the voltage of the utility grid 13 is larger than a predetermined value (for example, 0.5 pu), the controller 41 connects the switching section 42 to a 0 side (namely, the torsional vibration repressing section 40 and the pitch angle controller 20 are not connected), and when the voltage of the utility grid 13 is the predetermined value (for example, 0.5 pu) or less, the controller 41 connects the switching section 42 to the torsional vibration repressing section 40.

When the voltage of the utility grid 13 is the predetermined value or less, the torsional vibration repressing section 40 outputs the pitch angle correcting amount for repressing torsional vibration using an aerodynamic torque Tin calculated by differentiating the value of the generator speed ω. Concretely, the torsional vibration repressing section 40 is D control (Derivative Control), and differentiates the generator speed ω, and multiplies the differentiated value by a predetermined gain so as to output the pitch angle correcting amount.

Since the generator speed ω is expressed by integration of a torque T (=Tin−Tout) (see the following formula (1)), differentiation of the generator speed ω is expressed as the torque T. Further, Tin represents an aerodynamic torque, Tout represents an electric torque, and τ represents a moment of inertia, the following formula (2) holds.

{Formula 1}

$$\omega = \frac{1}{\tau} \times \int T dt \qquad (1)$$

$$\tau \frac{d\omega}{dt} = Tin - Tout \qquad (2)$$

When the voltage of the utility grid 13 is the predetermined value or less and a low voltage is generated, the electric torque Tout=0. For this reason, the torsional vibration repressing section 40 calculates a pitch angle for repressing torsional vibration through the aerodynamic torque Tin as the pitch angle correcting amount, and feeds back the pitch angle to the pitch angle controller 20. As a result, in the pitch angle controller 20 described later, since a temporary pitch angle command value is corrected by the pitch angle correcting amount for repressing torsional vibration through the aerodynamic torque Tin and the pitch angle command value is determined, the torsional vibration can be repressed according to the generator speed ω.

Further, in this embodiment, the controller 41 switches the switching section 42 based on the drop in the voltage of the utility grid 13, but the switching is not limited to this. For example, the voltage of generator is detected, and the voltage drop of the generator is regarded as a drop in the voltage of the utility grid, so that the switching section 42 may be switched based on the voltage drop of the generator.

The power controller 30 has a switching unit 33, a first subtracter 34, a first PI controller 35, a power controller 36, and a power setting calculator 37. Further, the switching unit 33, the first subtracter 34, the first PI controller 35, the power controller 36, and the power setting calculator 37 execute a calculating step at each clock cycle of a system clock to be used in a main control device 19, so as to determine and output the active power command P* and the reactive power command Q*.

The switching unit 33 performs a switching operation between a minimum speed ωmin and a rated speed ωmax based on the generator speed ω, and sets any one selected speed as a power control speed command ωP*. Concretely, when the generator speed ω is the predetermined value or less, the switching unit 33 sets the power control speed command ωP* as the minimum speed ωmin, and when the generator speed ω is larger than the predetermined value, it sets the power control speed command ωP* as the rated speed ωmax.

The first subtracter 34 subtracts the power control speed command ωP* from the generator speed ω so as to calculate a deviation ΔωP.

The power controller 36 determines a power command lower limit Pmin and a power command upper limit Pmax for PI control in the first PI controller 35 based on the generator speed ω and the pitch angle command β* so as to output these information. The power controller 36 outputs information about a rated power Prated to a subtracter 22 of the pitch angle controller 20.

The first PI controller 35 responds to the deviation ΔωP with the active power command P* being limited to a range between the power command lower limit Pmin and the power command upper limit Pmax and makes the PI control so as to determine the active power command P*.

The power setting calculator 37 calculates the reactive power command Q* based on the active power command P* generated by the first PI controller 35 and a power factor command for specifying a power factor of an alternating current power output from a wind turbine generator 10 and outputs the active power command P* and the reactive power command Q*.

The pitch angle controller 20 determines and outputs a pitch angle command value that is a command value of the pitch angle of the wind turbine blades 12 according to the generator speed ω. Further, when the voltage of the utility grid 13 is the predetermined value (for example, 0.5 pu or less) or less, the pitch angle controller 20 controls the pitch angle so that torsional vibration that is generated on the spindle system for transmitting the rotation of the wind turbine rotor 11 to the generator is repressed.

The pitch angle controller 20 determines the pitch angle command value based on a temporary pitch angle command value determined based on a first pitch angle control value determined by a difference between the generator speed ω and the rated speed and a second pitch angle control value determined by a difference between the output power of the generator and the rated power, and the pitch angle correcting amount output from the torsional vibration repressing section 40.

Concretely, the pitch angle controller 20 includes a second subtracter 21, a third subtracter 22, a second PI controller 23, a third PI controller 24, an adder 25, and a pitch angle determinator 26. Further, the second subtracter 21, the third subtracter 22, the second PI controller 23, the third PI controller 24, the adder 25, and the pitch angle determinator 26 execute the calculating step at each clock cycle of the system clock to be used in the main control device 19 so as to determine and output the pitch angle command β*.

The subtracter 21 subtracts a pitch control speed command ωβ* from the generator speed ω so as to calculate a deviation Δωβ. The pitch control speed command ωβ* matches with the rated speed ωmax, and thus the deviation Δωβ represents the difference between the generator speed ω and the rated speed ωmax.

The second PI controller 23 makes the PI control in response to the deviation Δωβ, and calculates a pitch angle command foundation value (first pitch angle control value) βin*. The pitch angle command foundation value βin is determined so that the generator speed ω is controlled to the rated speed ωmax.

The third subtracter 22 subtracts the rated power Prated from the active power command P* so as to calculate a deviation ΔP.

The third PI controller 24 makes the PI control in response to the deviation ΔP so as to calculate a correction value (second pitch angle control value) Δβ*.

The adder 25 adds the pitch angle command foundation value βpin and the correction amount Δβ* so as to calculate a temporary pitch angle command β' that is the temporary pitch angle command value.

When the second PI controller 23 adjusts the generator speed ω to the rated speed ωmax, it undesirably abandons aerodynamic energy that should be taken out as an electric power in some cases. In this embodiment, therefore, the third PI controller 24 calculates the correction value Δβ* in response to the difference between the rated power Prated and the active power command P*, and corrects the temporary pitch angle command β' using the correction value Δβ*.

When the active power command P* is smaller than the rated power Prated, namely, the deviation ΔP (=P*−Prated) is a negative value, the correction value Δβ* is determined so that the temporary pitch angle command β' is smaller than the pitch angle command foundation value βin*, namely, the pitch angle β is closer to a fine side. Such control represses a state that the pitch angle β is on a feather side just before the active power command P* reaches the rated power Prated. After the active power command P* reaches the rated power Prated, the deviation ΔP is 0, and the correction value Δβ* is also 0.

The pitch angle determinator 26 adds the temporary pitch angle command value β' and the pitch angle correcting amount for repressing the torsional vibration using an aerodynamic torque so as to determine the pitch angle command value β*.

Figure 3:
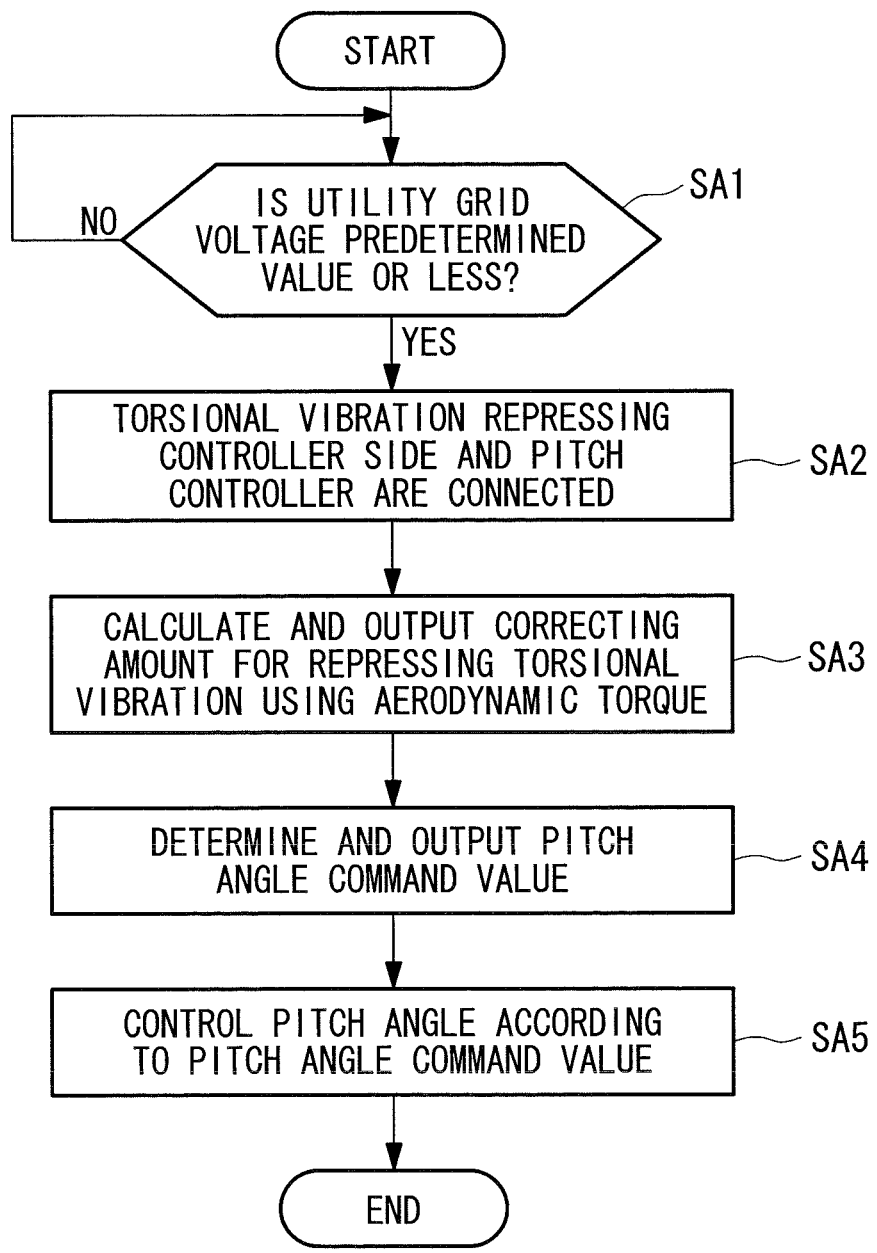
FIG. 3 is an operation flow of the wind turbine generator in FIG. 1.

FIG. 3 is a flowchart illustrating a control process in a case where the voltage of the utility grid 13 drops in the wind turbine generator 10 according to this embodiment.

In the wind turbine generator 10, the torsional vibration repressing section 40 detects the voltage of the utility grid 13 and determines whether the voltage of the utility grid 13 is the predetermined value or less (step SA1). The determination is made that the voltage of the utility grid is not the predetermined value or less, the process at step SA1 is repeated, and a determination is made that the voltage of the utility grid 13 drops at predetermined time intervals in the torsional vibration repressing section 40.

When the determination is made at step SA1 that the voltage of the utility grid 13 is the predetermined value or less, the controller 41 controls the switching section 42 and connects the torsional vibration repressing section 40 with the pitch angle controller 20 (step SA2).

Further, when the low voltage event in the utility grid is detected, the pitch angle correcting amount for repressing the torsional vibration using the aerodynamic torque Tin is calculated based on the generator speed co in the torsional vibration repressing section 40 and is output. (Step SA3)

The adder 25 calculates the temporary pitch angle command value β' based on the generator speed ω, the rated speed ωmax, the rated output power Prated, and the active power command P*. Further, when the torsional vibration repressing section 40 and the pitch angle controller 20 are connected, the pitch angle determinator 26 determines the pitch angle command value β* based on the pitch angle correcting amount acquired from the torsional vibration repressing section 40 and the temporary pitch angle command value β' acquired from the adder 25 and outputs the pitch angle command value β* (step SA4). The wind turbine blades 12 are controlled based on the determined pitch angle command value β* so that the torsional vibration is repressed (step SA5).

One example of transition of the torsional torque in a case where the pitch angle is controlled and transition of the torsional torque in a case where the torsional vibration repressing section 40 controls the pitch angle according to this embodiment without using the torsional vibration repressing section 40 are described below with reference to FIG. 4.

Figure 4:
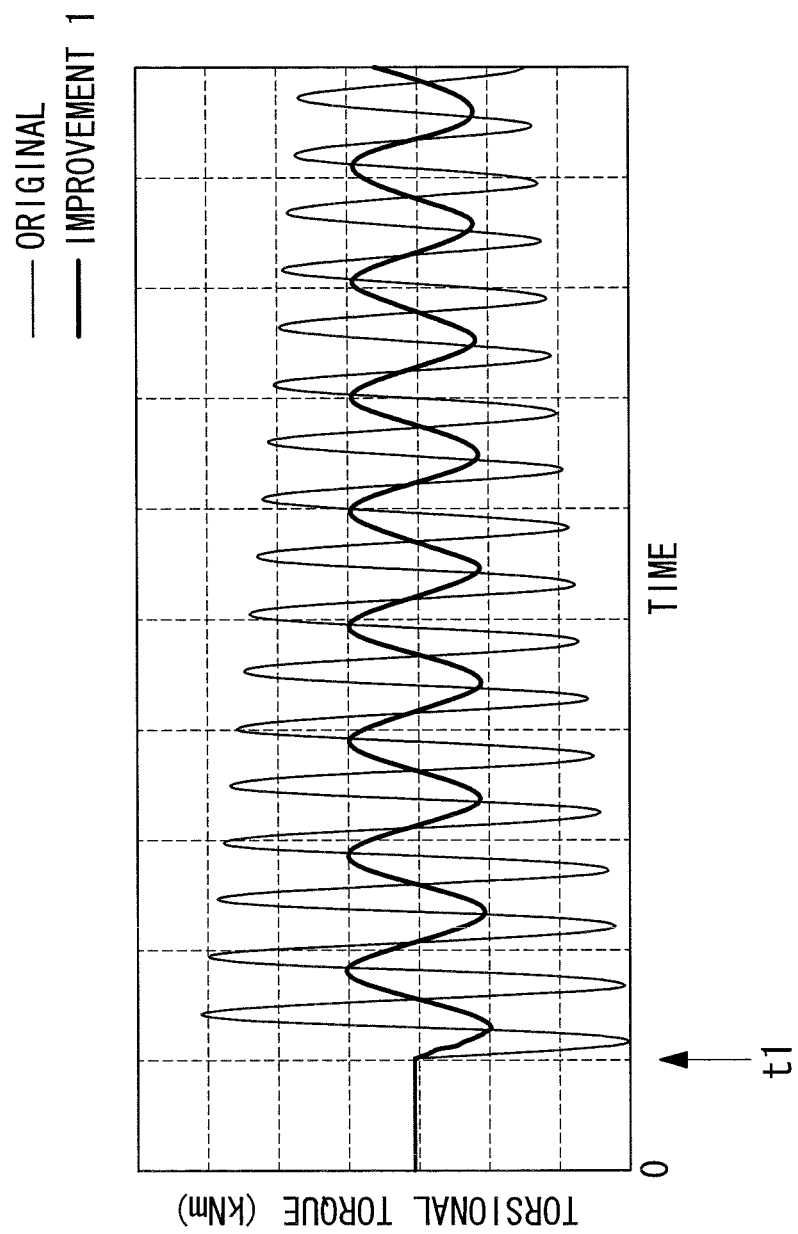
FIG. 4 is a diagram illustrating transition of a torsional torque in cases where the torsional vibration repressing section is used and is not used.

As shown by an original line of FIG. 4, when the pitch angle of the wind turbine blades 12 is controlled without using the torsional vibration repressing section 40 and the voltage of the utility grid drops at time t1, the generator stops and the attenuation effect for repressing the torsional vibration that is produced for a period while the generator is generating a power is eliminated. As a result, stronger torsional vibration is generated at an earlier time of the voltage drop of the utility grid.

On the contrary, in the pitch angle control according to this embodiment, when the voltage of the utility grid drops and the output power of the generator reduces, the pitch angle for repressing the torsional vibration using the aerodynamic torque is added as the correcting amount according to the speed of the generator so that the pitch angle command value is output. As a result, as indicated by a thick line (improvement 1) of FIG. 4, even when the voltage of the utility grid drops at time t1, the torsional vibration can be reduced further in comparison with the original line.

As described above, according to the wind turbine generator 10, the method and the program of the wind turbine generator according to this embodiment, in the wind turbine generator 10 including the rotor 11 having the plurality of wind turbine blades 12, the generator to be driven by the rotation of the rotor 11, and the pitch angle controller 20 for controlling the pitch angle of the wind turbine blades 12 according to the generator speed ω, when the voltage of the utility grid 13 is the predetermined value or less, the pitch angle is controlled so that the torsional vibration of the spindle system is repressed.

When the voltage on the side of the utility grid drops, the pitch angle of the wind turbine blades 12 is controlled so that the torsional vibration is repressed. For this reason, the torsional vibration can be securely repressed. As a result, the load that is applied to the wind turbine blades 12 when the voltage of the utility grid 13 drops can be reduced, so that mechanical damages of a gear box, a gear and a bearing can be prevented. Further, since the pitch angle correcting amount for suppressing the torsional vibration through the aerodynamic torque calculated based on the generator speed ω is output, even when the torsional vibration is generated and the speed fluctuates, the control can be made based on the aerodynamic torque corresponding to the fluctuated speed.

REFERENCE SIGNS LIST 10 wind turbine generator
13 utility grid
16 spindle
20 pitch angle controller
26 pitch angle determinator
30 power controller
40 torsional vibration repressing section (torsional vibration repressing means)

The invention claimed is:

1. A wind turbine generator comprising:
a rotor having a plurality of wind turbine blades;
a generator to be driven by rotation of the rotor;
a pitch angle control part for outputting a pitch angle command value for controlling a pitch angle of the wind turbine blades according to a speed of the generator; and
a torsional vibration repressing part for outputting a pitch angle correcting amount for repressing the torsional vibration through an aerodynamic torque calculated by differentiating the speed of the generator,
wherein
only when a voltage of a utility grid is a predetermined value or less, the pitch angle control part is connected to the torsional vibration repressing part to output the pitch angle command value so that torsional vibration generated on a spindle system for transmitting the rotation of the rotor to the generator is repressed.

2. The wind turbine generator according to claim 1, wherein the pitch angle control part determines the pitch angle command value based on a temporary pitch angle command value and the pitch angle correcting amount, and
wherein the temporary pitch angle command value is determined based on:
a first pitch angle control value determined by a difference between the speed of the generator and a rated speed, and
a second pitch angle control value determined by a difference between an output power of the generator and a rated power.

3. A method for controlling a wind turbine generator including a rotor having a plurality of wind turbine blades, and a generator to be driven by rotation of the rotor, the method comprising:
outputting a pitch angle command value for controlling a pitch angle of the wind turbine blades according to a speed of the generator;
outputting a pitch angle correcting amount for repressing the torsional vibration through an aerodynamic torque calculated by differentiating the speed of the generator,
wherein
only when a voltage of a utility grid is a predetermined value or less, the pitch angle command value is output so that torsional vibration generated on a spindle system for transmitting the rotation of the rotor to the generator is repressed.

4. A program for controlling a wind turbine generator including a rotor having a plurality of wind turbine blades, and a generator to be driven by rotation of the rotor, the program causing a computer to implement the steps of:
outputting a pitch angle command value for controlling a pitch angle of the wind turbine blades according to a speed of the generator; and
outputting a pitch angle correcting amount for repressing the torsional vibration through an aerodynamic torque calculated by differentiating the speed of the generator,
wherein
only when a voltage of a utility grid is a predetermined value or less, allowing a computer to execute a process in which the pitch angle command value is output so that torsional vibration generated on a spindle system for transmitting the rotation of the rotor to the generator is repressed.

* * * * *